United States Patent
Guilhem et al.

(10) Patent No.: US 11,225,064 B2
(45) Date of Patent: Jan. 18, 2022

(54) METHOD AND MACHINE FOR BONDING A FLEXIBLE COATING TO A SUPPORT USING ELECTROMAGNETIC WAVES AND LINING PRODUCED IN THIS WAY

(71) Applicant: C-GEX SYSTEM'S, Albias (FR)

(72) Inventors: Christian Guilhem, Albias (FR); Marc Guilhem, Mirabel (FR); Jacques Guilhem, Montauban (FR)

(73) Assignee: C-GEX SYSTEM'S, Albias (FR)

( * ) Notice: Subject to any disclaimer, the term of this patent is extended or adjusted under 35 U.S.C. 154(b) by 421 days.

(21) Appl. No.: 15/312,891

(22) PCT Filed: May 19, 2015

(86) PCT No.: PCT/FR2015/051310
§ 371 (c)(1),
(2) Date: Nov. 21, 2016

(87) PCT Pub. No.: WO2015/177456
PCT Pub. Date: Nov. 26, 2015

(65) Prior Publication Data
US 2017/0182757 A1    Jun. 29, 2017

(30) Foreign Application Priority Data
May 22, 2014    (FR) ..................... 14.54619

(51) Int. Cl.
B32B 37/06    (2006.01)
B29C 65/14    (2006.01)
(Continued)

(52) U.S. Cl.
CPC .......... *B32B 37/06* (2013.01); *B29C 65/1425* (2013.01); *B29C 65/1435* (2013.01);
(Continued)

(58) Field of Classification Search
CPC .. B32B 37/06; B32B 37/1207; B29C 65/1438
See application file for complete search history.

(56) References Cited

U.S. PATENT DOCUMENTS 5,176,777 A * 1/1993 Guilhem ............. B29C 33/3821
100/295
5,254,197 A   10/1993 Klems
(Continued)

FOREIGN PATENT DOCUMENTS

EP    0 350 979 A1    1/1990
WO   2010/023394 A2   3/2010

OTHER PUBLICATIONS

International Search Report, dated Jul. 29, 2015, from corresponding PCT application.

*Primary Examiner* — Christopher T Schatz
(74) *Attorney, Agent, or Firm* — IPSILON USA, LLP

(57) ABSTRACT

A machine (1) and a method for thermobonding using an emission of electromagnetic waves (13), for example microwaves, to activate one or a plurality of adhesive layers located between a support and one or a plurality of layers of flexible covering, through a bed of particles (4) fluidized by a humidified gas. A multi-layer upholstery item including at least one non-permeable layer and produced in a single operation is also described.

9 Claims, 2 Drawing Sheets

Figure 1A:
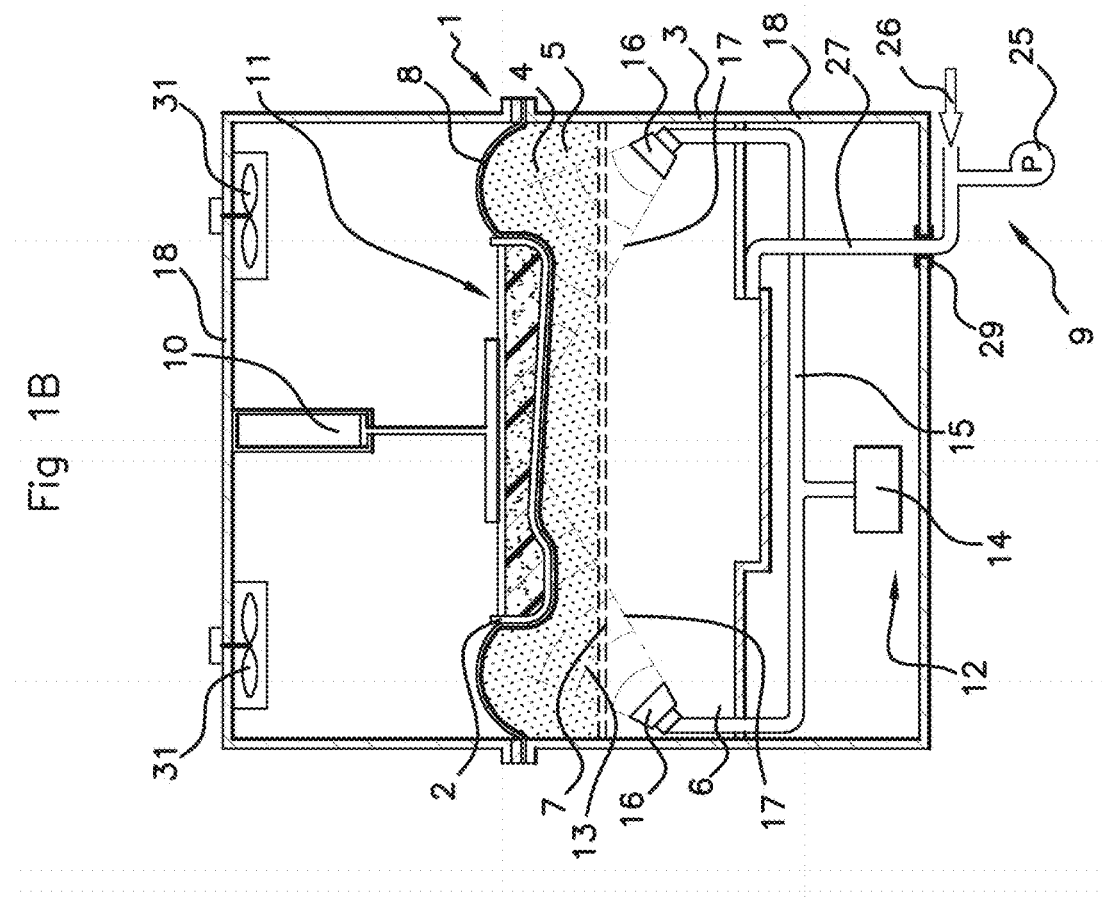

(51) Int. Cl.
  *B29C 65/00* (2006.01)
  *B68G 7/05* (2006.01)
  *B29C 65/50* (2006.01)
  *B29C 65/48* (2006.01)
  *B29D 99/00* (2010.01)
  *B32B 5/02* (2006.01)
  *B32B 5/18* (2006.01)
  *B32B 7/12* (2006.01)
  *B32B 37/12* (2006.01)
  *B68G 7/052* (2006.01)
  *B29L 31/58* (2006.01)
  *B29L 31/00* (2006.01)
  *B29L 31/30* (2006.01)

(52) U.S. Cl.
  CPC ...... *B29C 65/1438* (2013.01); *B29C 65/1441* (2013.01); *B29C 65/1467* (2013.01); *B29C 65/1487* (2013.01); *B29C 65/4815* (2013.01); *B29C 65/4845* (2013.01); *B29C 65/5057* (2013.01); *B29C 66/1122* (2013.01); *B29C 66/301* (2013.01); *B29C 66/5326* (2013.01); *B29C 66/723* (2013.01); *B29C 66/727* (2013.01); *B29C 66/81267* (2013.01); *B29C 66/81455* (2013.01); *B29C 66/81459* (2013.01); *B29C 66/8242* (2013.01); *B29C 66/8322* (2013.01); *B29D 99/0092* (2013.01); *B32B 5/022* (2013.01); *B32B 5/18* (2013.01); *B32B 7/12* (2013.01); *B32B 37/1207* (2013.01); *B68G 7/05* (2013.01); *B68G 7/052* (2013.01); *B29C 66/729* (2013.01); *B29C 66/7294* (2013.01); *B29C 66/7484* (2013.01); *B29K 2913/00* (2013.01); *B29L 2031/3041* (2013.01); *B29L 2031/58* (2013.01); *B29L 2031/751* (2013.01); *B29L 2031/771* (2013.01); *B32B 2037/1223* (2013.01); *B32B 2601/00* (2013.01)

(56) References Cited

U.S. PATENT DOCUMENTS

| | | |
|---|---|---|
| 5,407,510 A | 4/1995 | Marfilius et al. |
| 2004/0226648 A1 | 11/2004 | Gupte et al. |
| 2011/0190926 A1 | 8/2011 | Guilhem et al. |

* cited by examiner

METHOD AND MACHINE FOR BONDING A FLEXIBLE COATING TO A SUPPORT USING ELECTROMAGNETIC WAVES AND LINING PRODUCED IN THIS WAY

The invention relates to a method and machine for bonding a flexible covering to a support, said method and machine using a diffusion of electromagnetic waves to modify the state of an adhesive located between two surfaces to be bonded, for example, for the bonding of a fabric or leather cover to a support formed from a frame and a foam shape in order to produce upholstery items for seats. The invention also relates to an upholstery item produced in this way.

EP 0 350 979 discloses, for example, a method and a machine for covering an object using a bed of particles fluidised by a flow of hot gas on which is placed a fabric cover previously coated which thermo-activated adhesive to which the support to be covered is applied. The use of hot gas to activate the adhesive has proved to be uneconomical and unergonomic, the dispersed hot gas increasing the temperature of the workstation and constituting a waste of energy.

Other solutions have been explored, such as the use of high frequency electromagnetic waves. U.S. Pat. No. 5,254,197 thus describes a method and a machine for bonding a flexible covering to a foam support using a flow of microwaves to heat water droplets forming part of the adhesive formulation or well dispersed on or under the adhesive layer. In this document, the covering and an adhesive film are placed on a mould which is inert to the microwaves and are held thereon by suction. In a first embodiment, a microwave emitter is temporarily placed between the foam support and the covering during the time required to heat the adhesive film then the emitter is moved away and the support is pressed onto the adhesive film. This embodiment has the disadvantage of stopping the heating of the adhesive before applying the support, which does not allow the temperature of the adhesive to be controlled at the time of pressing. A second embodiment provides for the pressing of the support onto the covering and the mould within an industrial microwave oven, then actuating microwave emitters placed around the assembly. In this case, holding the covering and the adhesive film on the mould by suction presents the disadvantage of sucking the water into the mould and does not permit precise control of the amount of heat and thus the effectiveness of the bonding thus effected. Furthermore, the spraying of a sufficient quantity of water to compensate for this suction or the use of an adhesive comprising a large quantity of water can damage some covering materials to be bonded (for example, leather). In any case, this method has the disadvantage of using a perforated mould, which is extremely expensive for any shape of product to be made.

The object of the present invention is to propose a method and a machine for bonding a covering on a support, which does not have the disadvantages of the prior art.

The invention aims to provide such a machine, which enables the quality of work of the employees using the bonding method to be improved.

The invention also aims to propose such a machine and a method which make it possible to improve the productivity of a workstation fitted with the machine in accordance with the invention and implementing the method.

The invention also relates to a machine of this type which permits substantial energy savings compared with the known hot gas devices.

In order to do this, the invention relates to a machine for the thermobonding of a flexible covering onto a support, of the type comprising:
 a housing for a bed of particles fluidised by a flow of gas, comprising a gas distributer, a diffusion grating, a bed of particles and a flexible cover sheet,
 a gas supply system,
 a compression member suitable for pressing the support onto the bed of particles, characterised in that
 the gas supply system comprises means for supplying a gas flow having a relative level of humidity of between 70% and 100%,
 the housing comprises at least one electromagnetic wave emitter placed so that the waves are oriented in the direction of the compression member.

By virtue of the combination of a bed fluidised by means of a wet gas, which permits water molecules to be diffused in the different layers to be bonded and in the fluidised bed itself, and an electromagnetic wave emitter which is able to excite the water molecules and to generate a rise in temperature, the inventors have been able to discover that the rise in temperature at the adhesive layers was achieved very rapidly, in a few seconds or some tens of seconds compared with times of the order of one to several minutes required in a bed fluidised by hot air. By reason of these very short times, the fluidised bed remains at ambient temperature or becomes slightly warm but no longer causes the dispersion of the quantities of heat dissipated as sheer loss in a bed fluidised by hot air. The conditions of the workstation in terms of heat are thus greatly improved and less energy is wasted.

In an advantageous manner in accordance with the invention, each wave emitter has an electromagnetic wave generator, a waveguide and an antenna, said antenna being placed under the bed of particles and being suitable for diffusing the electromagnetic waves through a solid angle centred on the antenna and at an angle suitable for intercepting the support. Thus, depending on the power required, it is possible to define a number of arrangements from a generator or magnetron placed directly under the bed of particles, for example, in the cavity of the gas distributor, and emitting directly along a vertical axis in the direction of the compression member as far as a plurality of generators connected by waveguides to antennas distributed below the bed of particles and oriented to cover—at appropriate orientation angles—a surface of the bed of particles corresponding to the surface of the support. A preferred embodiment can thus comprise a magnetron connected to four waveguides connected to four horn antennas placed at the four corners of the bed of particles and each intercepting a surface corresponding to that of the support when it is made to lie closely against the bed of particles at a different angle.

In an advantageous manner in accordance with the invention, the housing is enclosed in a metal casing suitable for containing the electromagnetic waves within the casing. In order to ensure the safety of the employees working on the machine or in proximity thereto, the machine is placed in a conductive casing forming a Faraday cage in order to avoid any leakage of electromagnetic waves. The casing can be formed at least in part by plates of conductive sheet metal (for example, metal or metallised) or by gratings or conductive mesh. All the elements forming the casing are electrically connected to each other and to ground.

In an advantageous manner in accordance with the invention, the casing comprises a door suitable for permitting the introduction of the flexible covering and of the support to the inside of the housing. The casing can thus comprise a sliding door, named a guillotine door, also made from conductive material, permitting access to the surface of the bed of particles and to the compression member in order to place the covering to be bonded onto the bed of particles and the support onto the compression member. This door advantageously has a security device preventing the electromagnetic wave generator(s) from being powered whenever it is not closed.

In an advantageous manner in accordance with the invention, the machine comprises at least one wave stirrer inside the casing to distribute the electromagnetic waves. The use of one or a plurality of wave stirrers inside the casing, preferably installed on the upper part thereof, makes it possible to return the electromagnetic waves in the direction of the bed of particles so as to eliminate possible "shadow zones" which could have a detrimental effect on uniform bonding of the covering to the support.

The invention also relates to a method for thermobonding a flexible covering onto a support, of the type using a machine having any one of the features mentioned above, using a compression member able to press the support onto a bed of particles fluidised by a flow of gas generated by a system for supplying gas into a housing comprising a gas distributer, a diffusion grating, a bed of particles and a flexible cover sheet, the method being characterised in that:
  at least the covering, an adhesive layer and the support are stacked in this order on the cover sheet,
  a flow of wet gas is used to fluidise the bed of particles,
  the compression member is applied onto the support in order to press the support onto the covering,
  the supply of gas is modified so as to consolidate the bed of particles,
  an electromagnetic wave emitter is triggered so as to heat at least the adhesive layer,
  the emission of waves is maintained for a predetermined time suitable for activating the adhesive layer,
  the emission of waves is stopped, the compression member is raised and the covered support is discharged.

By virtue of the use of a wet gas to fluidise the bed of particles, this bed has less fluidity (compared with the fluidity obtained with dry air) making it possible, during a first period when the compression member is applied to the bed of fluidised particles, for the covering and the adhesive layer to lie more closely against the support. Furthermore, merely decreasing the flow rate of the wet gas, for example, from 10 m$^3$ per minute to 2 m$^3$ per minute is sufficient to consolidate the bed of particles and to allow significant pressure to be exerted on the stack of layers. The inventors have also observed that the pressure exerted on the stack permitted accelerated warming of the adhesive layer during application of the electromagnetic waves, leading to the covering being bonded to the support. However, when the emission of the electromagnetic waves stops, the adhesive layer cools very rapidly owing to the diffusion of the gas which is at ambient temperature, which permits rapid setting of the adhesive and shortened cycle time compared to the prior art methods using a hot gas. The adhesive layer is thus activated during, and only during, the emission of the electromagnetic waves or during a period of a few seconds to a few tens of seconds, depending on the power used. It has been possible to measure that about ten seconds with a radiated power of the order of 800 W to 1 kW was sufficient to effect satisfactory bonding, which represents a considerable energy saving compared to the 6 kW permanently consumed in a hot gas bonding machine, which makes possible a cycle time of just one to two minutes per manufactured piece because of the necessary cooling times.

In an advantageous manner in accordance with the invention, the humidity of the gas is used to wet the adhesive layer in order to render it reactive to the electromagnetic waves. The circulation of a wet gas, vector of water molecules, before and during the first pressing phase makes it possible to increase the level of humidity of the adhesive layer and thus to increase its reactivity to the electromagnetic waves without it being necessary to carry out additional sprinkling below and above the adhesive layer, as in the known methods.

In an advantageous manner in accordance with the invention, the support used comprises a foam layer, an adhesive layer and a shaped plate, these items not being assembled, and the assembly of the support is carried out simultaneously with the bonding of the covering to the support. By virtue of the use of electromagnetic waves which easily penetrate the stack in order to heat the adhesive layer(s) directly, it has been observed that it was then possible to carry out a plurality of adhesive procedures simultaneously, unlike in the case of methods which use the conduction of heat from the outer covering layer. It is thus possible to produce the support by bonding a foam layer to a rigid shaped plate (for example, a frame of the backrest or seat part of a seat) made from plywood or a synthetic material, at the same time as the bonding of the covering to the other face of the foam layer.

In an advantageous manner in accordance with the invention, a fire-resistant felt and an additional adhesive layer are also interposed between the covering and the support. In the same way, by virtue of the penetration of the electromagnetic waves, it is possible to add different layers permitting an improvement in the functionality of an upholstery item for a seat, for example, by adding a layer of fire-resistant felt, without inordinately increasing the cost of the upholstery item, it being possible to carry out the additional bonding operations concurrently.

The invention also relates to a multilayer upholstery item obtained by a method as set forth above, characterised in that it comprises at least one non-permeable covering layer. In fact, in contrast to the bonding operations in which the hot gas had to pass through the various layers in order to bring the adhesive to a temperature which permitted reactivation thereof, the penetration of the electromagnetic waves makes it possible to interpose non-permeable covering layers such as natural or imitation leather or coated fabric coverings, and to produce upholstery items comprising such coverings.

The invention also relates to a machine, a method and an upholstery item which are characterised in combination by all or some of the features mentioned above or below.

Figure 1B:
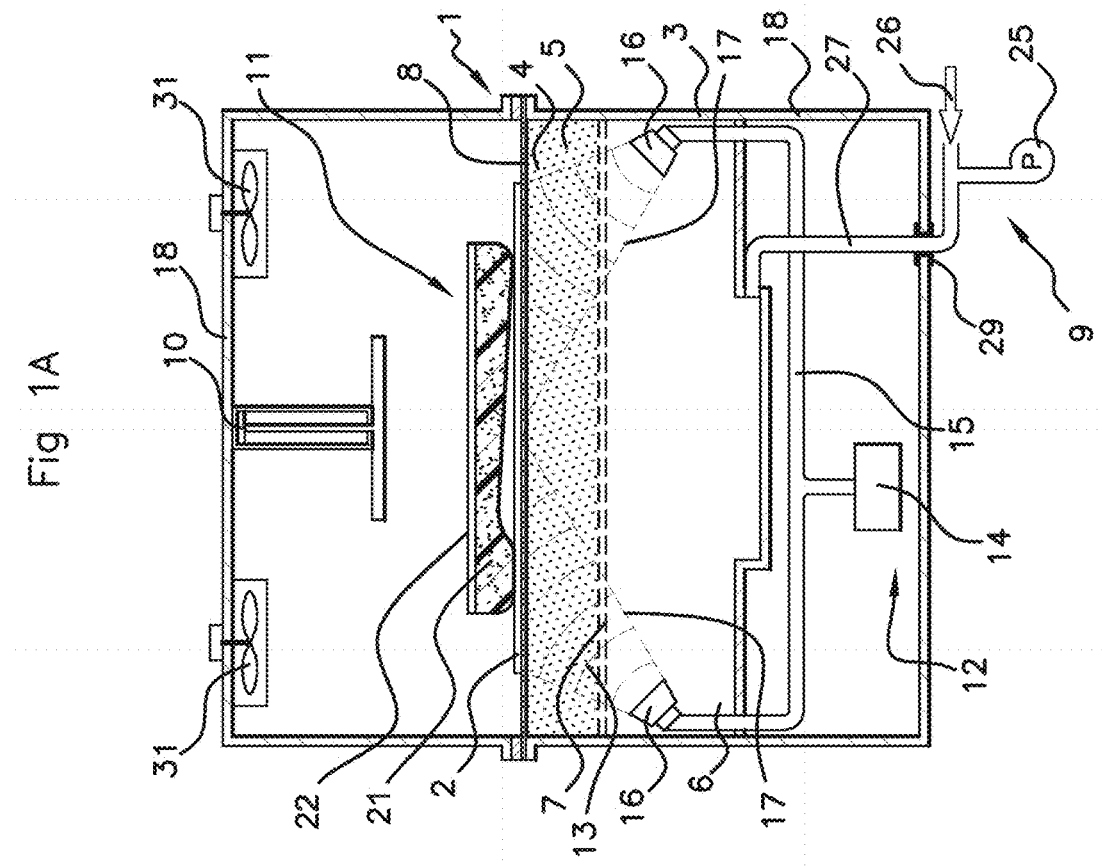
Figure 2:
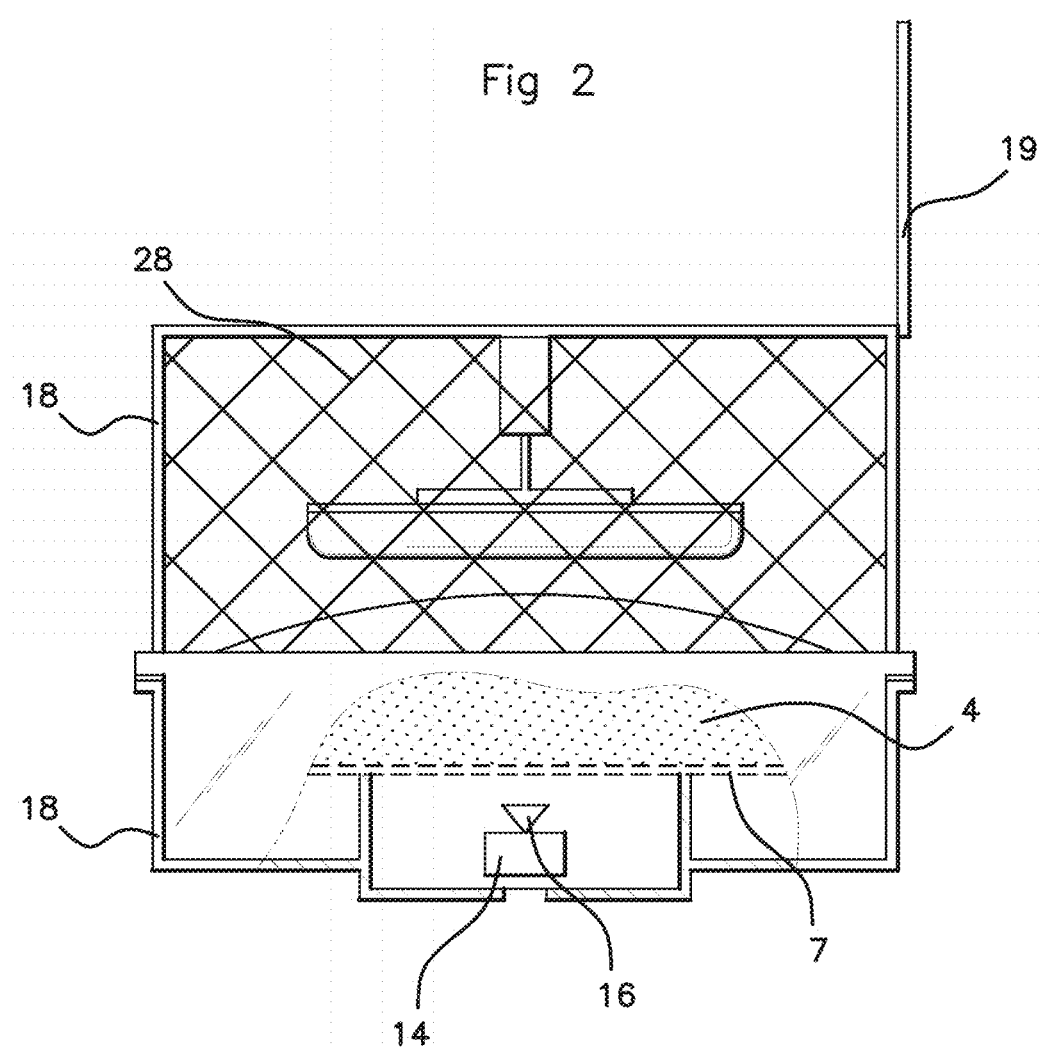
Figure 3:
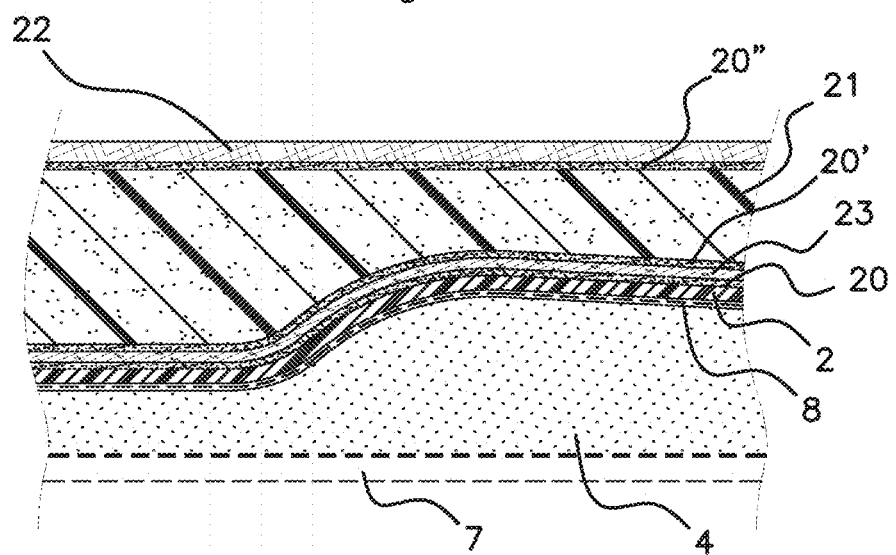

Other aims, features and advantages of the invention will become clear in light of the following description and the attached drawings in which:

FIGS. 1A and 1B are schematic cross-sectional front views of a machine in accordance with the invention, in the loading and working positions respectively, FIG. 2 is a side view of a machine in accordance with the invention, showing its protective casing and the door thereof, FIG. 3 is a partial cross-sectional view of an upholstery item in accordance with the invention.

The machine 1 shown in FIG. 1A has a housing 3, preferably made of metal, in which are arranged, from top to bottom, a flexible cover sheet 8 defining the upper part of a bed of particles 4 formed from glass microbeads 5. This bed of particles 4 rests on a diffusion grating 7 permitting passage of a gas from a space, named a distributor 6, located below the grating 7 into the bed of particles 4 so as to fluidise this bed of particles. The distributor 6 is supplied with gas, preferably air under pressure by a gas supply system comprising a pump 25 connected to a duct 27 opening into the distributor 6.

According to one important feature of the invention, the gas supply system also comprises a nozzle 26 for spraying water under high pressure, permitting a mist of fine water droplets to be sent into the duct 27. These water droplets instantly vaporise and humidify the air sent by the pump 25. In the same way, the distributor 6 and the bed of particles 4 are supplied with the wet air. Depending on the flow rate of air supplied by the pump 25 and the quantity of water sprayed by the nozzle 26, the relative humidity of the air supplied to the distributor can be regulated, for example, between 70% and 100%.

The flow rate of air of the pump 25 can also be regulated, for example, between a full flow rate of the order of 10 m$^3$ per minute and a reduced flow rate of the order of 2 m$^3$ per minute or even a zero flow rate. When the bed of particles 4 is supplied by a full flow rate of wet air it behaves as a fluid, preferably as a 'muddy' fluid having a viscosity of the order of 2 to 10 Pa·s. When the bed of particles is supplied at a reduced flow rate or when it is not supplied, the bed of particles solidifies and holds a shape imparted to it in the fluid state, as shown in FIG. 1B.

Above the sheet 8 covering the bed of particles 4, the machine has a compression member 10, in this case a cylinder suitable for pressing a support 11 onto the bed of particles. The support 11 forms, for example, the seat part or the backrest of a seat to be covered with a flexible covering made of fabric, leather or imitation leather, etc.

The machine 1 also comprises, in its housing 3, at least one emitter 12 of electromagnetic waves 13. In the example shown in FIG. 1, the emitter 12 has a wave generator, for example, a magnetron 14 to which is/are connected one or more waveguides 15 carrying the electromagnetic waves to one or more antennas 16, for example, horn-type antennas. The antennas 16 are placed in the distributor 6 and oriented so that the electromagnetic waves are oriented towards the compression member 10, and more particularly so that the electromagnetic waves 13 are diffused through a solid angle 17 centred on each antenna and being at an angle suitable for intercepting the support 11. The electromagnetic waves 13 thus emitted have a wavelength between 1 GHz and 300 GHz, in the spectrum generally called the microwave spectrum, and more particularly in a band of 2 to 10 GHz, suitable for heating the water molecules and a power between 800 W and 4 KW depending on the exact usage (materials to be bonded, dimensions of the support etc.) of the machine.

The machine 1 is completed by a casing 18 made of conductive material and enclosing the internal space of the machine so as to confine the electromagnetic waves within the machine and to ensure the protection of people using or moving around the machine. The casing 18 can consist of an enclosure made from metal sheets closing the housing 3 which is also made of metal, the assembly being earthed to form a Faraday cage or, as shown in FIG. 2, by a casing 18 formed of a conductive mesh 28 with a mesh size suitable for blocking the electromagnetic waves used, for example, a mesh size of the order of a millimetre for the frequency range of 2 to 10 GHz. A door 19, also made of mesh in the same way and mounted in a sliding manner (for example a door which can be raised and lowered, named a "guillotine" type door), permits the operator to access the inside of the machine to place the various elements to be bonded onto the sheet 8 of the bed of particles 4 and/or onto the compression member 10. The runners of the door 19 are suitable—for example, by using a system of deflectors, named quarter-wave deflectors—for avoiding leakage of electromagnetic waves when the door is closed. Bolts and safety switches are also installed on the door 19 and/or on the casing 18 to interrupt any emission of electromagnetic waves if the door is not closed correctly. When cables or ducts such as the duct 27 must pass through the housing 3 or the casing 18, suitable feedthroughs 29 are used to avoid wave leakage.

One or more wave stirrers 31 can also be installed inside the casing 18 to improve distribution of the electromagnetic weaves 13 within the casing 18.

In the example shown in FIG. 2, the electromagnetic wave emitter is simply produced by a single magnetron 14 placed in the centre of the housing and comprising an antenna 16 directed towards the support mounted on the compression member. Other embodiment variations of the electromagnetic wave emitter(s) can be envisaged depending on the features of the machine to be produced, such as the use of a plurality of magnetrons of average power (500 W-1 KW) or a high-power magnetron (1 KW-4 KW) coupled to a plurality of antennas, for example four antennas placed at the four corners of the distributor 6 etc.

Reference is made to FIGS. 1A, 1B and 3 to describe the bonding method permitting a simple upholstery item (not shown) or a complex upholstery item 30 as shown in FIG. 3 to be obtained. In this method, the operator opens the door 19 of the machine 1 and places onto the sheet 8 of the bed of particles 4 a first covering 2, for example a piece of fabric and more particularly a piece of coated fabric or leather as shown in FIG. 1A. At this stage, the wet gas supply system of the machine operates at a reduced flow rate and the wet air passes through the bed of particles, passes around the covering 2 and deposits moisture on the exposed face thereof. The covering 2 may have previously been covered with an adhesive layer 20 at an adjoining preparation station or the adhesive layer is deposited at the time of loading of the machine, for example in the form of a dry film pre-cut to the size of the covering 2. The flow of wet air prevailing in the internal work space of the machine is sufficient to load the adhesive layer 20 with moisture.

In the simplest embodiment of the method in which a simple upholstery item with a single covering is produced, the operator then places the support 11 formed by a shaped plate 22 on which a foam layer 21 has previously been bonded above the covering 2 and the adhesive layer 20. Alternatively, the operator can place the support 11 at the end of the compression member 10. By means of a control panel (not shown) the full flow rate of the wet gas flow is activated and the descent of the compression member 10 is controlled so as to press the support 11 onto the covering 2 covered with the adhesive layer 20. It should be noted that during this descent, the foam layer 21 is also loaded with moisture on its outer face. The support 11, the covering 2 and the adhesive layer 20 disposed therebetween are pressed into the bed of particles 4, then in the fluid state, so that the covering 2 matches the shape of the support 11 as shown in FIG. 1B. The supply of gas is then modified so as to return to the reduced rate or, alternatively, the flow of gas is shut off so as to solidify the bed of particles 4. The force applied by the compression member 10 is preferably increased so as to cause the foam layer 21 on the covering 2 and the adhesive layer 20 to be crushed.

The assembly of the pieces being thus immobilised, the operator closes the door 19 of the machine, which triggers the electromagnetic wave emitter. The electromagnetic waves 13 pass through the bed of particles 4, the covering 2 and the adhesive layer 20 which they heat by agitation of the water molecules present in or on the adhesive layer. An emission of some tens of seconds will suffice to cause the adhesive to reach its melting point and bond the covering 2 to the foam layer 21. After this time, which can be programmed by a timer, the emission of electromagnetic waves is stopped and the adhesive cools very rapidly. In fact, it has been observed that although the bed of particles is loaded with moisture, it is actually heated to a low degree in relation to its mass and it contributes to the cooling of the adhesive layer when the electromagnetic waves stop heating it. It has been possible to observe that this phenomenon makes it possible to shorten the bonding cycle times compared to a bed fluidised by hot air which requires significant waiting and cooling time before the adhesive is in a state in which it can be handled.

Once the adhesive has cooled sufficiently to be able to be handled, which is almost instantaneous, the operator opens the door 19, which causes the compression member to rise and discharges the covered support. The compression member 10 can optionally be kept in the low position while the operator carries out some supplementary operations such as pulling on an encircling cover cord or band in a hem previously provided on the periphery of the covering so as to fold back the free edges of the covering towards the centre of the support and to fix the two ends of the cord by bonding or stapling. Once these supplementary operations have been carried out, the compression member 10 rises and the covered support can be discharged.

The inventors have observed that, in contrast to the hot air machines where the circulation of the air in the various layers and the conduction thus caused, which permit the adhesive to be activated, in a machine in accordance with the invention, the electromagnetic waves are not stopped by an impermeable covering and pass through the entire thickness of the stack of the various layers. It has thus proved to be the case that this method makes it possible to effect multi-layer bonding in a single operation, even if one of the layers is non-permeable to air.

The method can thus be used to produce a complex upholstery item 30 as shown in FIG. 3. In this case, in the step of loading the machine, the operator places onto the bed of particles the covering 2 which will be on the outside of the upholstery item, the adhesive layer 20, an optional fire-resistant felt 23 (or any other layer of flexible material enabling a technical function to be provided, for example an impermeable film), a second adhesive layer 20', the foam layer 21, a third adhesive layer 20" then the shaped plate 22 forming the skeleton of the upholstery item. The various layers are thus stacked one on top of another then the compression member is lowered so as to exert pressure on the plate 22. In the same way as above, the flow of wet gas is reduced or interrupted to solidify the bed of particles, the door 19 is closed and the emission of electromagnetic waves is activated. Since the electromagnetic waves 13 are not stopped by the various layers of the upholstery item, all the adhesive layers 20, 20' and 20" are activated simultaneously. In the same way as for the simple bonding described above, the interruption of the emission of waves causes almost instantaneous cooling of the assembly of layers and the upholstery item 30 thus produced can be handled almost instantaneously. It then suffices to open the door 19, raise the compression member and discharge an upholstery item produced in a single operation.

Of course, this description is given merely by way of illustrative example and the person skilled in the art will be able to make numerous modifications thereto without departing from the scope of the invention, such as, for example, arranging the machine 1 so as to place the cylinder on the outside of the casing 18 as long as an appropriate wave leakage-preventing feedthrough is placed around the cylinder rod.

The invention claimed is:

1. Machine for the thermobonding of a flexible covering to a support, said machine comprising:
   a housing for a bed of particles fluidized by a flow of gas, said housing having a gas distributer, a diffusion grating, the bed of particles and a flexible cover sheet,
   a gas supply system for supplying a flow of gas into said bed of particles,
   a compression member suitable for pressing the support onto the bed of particles,
   wherein the gas supply system further comprises a nozzle such that said gas supply system is configured to spray water under pressure in the form of a mist of water droplets to obtain a resulting flow of gas, the resulting flow of gas having a relative level of humidity of between 70% and 100%, such that the bed of particles is fluidized by said resulting flow of gas,
   and wherein the housing comprises at least one emitter of electromagnetic waves oriented at said compression member and emitting waves that penetrate said bed of particles at a location, including said particles contacting said compression member, and wherein said emitter is configured to emit said electromagnetic waves upon closing of a door of said machine after said support is loaded in said machine, said machine further having a timer configured to shut off said emitter at a predetermined amount of time of about 10 seconds.

2. Machine according to claim 1, wherein the at least one wave emitter has an electromagnetic wave generator, a waveguide and an antenna, said antenna being placed under the bed of particles and being suitable for diffusing the electromagnetic waves through a solid angle centred on the antenna and at an angle suitable for intercepting the support.

3. Machine according to claim 1, wherein the housing is enclosed in a metal casing suitable for containing the electromagnetic waves within the casing.

4. Machine according to claim 3, wherein the casing comprises the door, said door suitable for permitting the introduction of the flexible covering and of the support to the inside of the housing.

5. Machine according to claim 3, further comprising at least one wave stirrer inside the casing to distribute the electromagnetic waves.

6. Machine according to claim 2, wherein the housing is enclosed in a metal casing suitable for containing the electromagnetic waves within the casing.

7. Machine according to claim 4, further comprising at least one wave stirrer inside the casing to distribute the electromagnetic waves.

8. The machine as claimed in claim 1, wherein said machine includes a control panel configured to depress said support towards said bed of particles and, at the same time, to begin said flow of gas having a relative level of humidity of between 70% and 100%.

9. The machine as claimed in claim 1, further comprising a control panel configured to reduce or stop said resulting flow of gas after said support is pressed against said bed of particles.

* * * * *